US011361537B2

(12) United States Patent
Laughlin et al.

(10) Patent No.: US 11,361,537 B2
(45) Date of Patent: Jun. 14, 2022

(54) ENHANCED COLLECTION OF TRAINING DATA FOR MACHINE LEARNING TO IMPROVE WORKSITE SAFETY AND OPERATIONS

(71) Applicant: The Boeing Company, Chicago, IL (US)

(72) Inventors: Brian D. Laughlin, Wichita, KS (US); William D. Kelsey, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 215 days.

(21) Appl. No.: 16/902,089

(22) Filed: Jun. 15, 2020

(65) Prior Publication Data
US 2021/0390280 A1 Dec. 16, 2021

(51) Int. Cl.
*G06K 9/62* (2022.01)
*G06V 20/13* (2022.01)
*G06F 16/9035* (2019.01)
*G06N 20/00* (2019.01)

(52) U.S. Cl.
CPC .......... *G06V 20/13* (2022.01); *G06F 16/9035* (2019.01); *G06K 9/6256* (2013.01); *G06N 20/00* (2019.01)

(58) Field of Classification Search
CPC ...... G06V 20/13; G06V 20/52; G06V 10/774; G06V 10/7788; G06F 16/9035; G06K 9/6256; G06K 9/0063; G06K 9/00771; G06K 9/6254; G06K 9/6264; G06N 20/00
See application file for complete search history.

(56) References Cited

U.S. PATENT DOCUMENTS

| | | | |
|---|---|---|---|
| 10,420,487 B1* | 9/2019 | Choi | A61B 5/6801 |
| 2019/0385430 A1* | 12/2019 | Criado-Perez | G08B 13/196 |
| 2020/0117903 A1* | 4/2020 | Goel | G06K 9/6273 |
| 2021/0056826 A1* | 2/2021 | Okubo | G06V 20/52 |

OTHER PUBLICATIONS

Bahn, Susanne. "Workplace hazard identification and management: The case of an underground mining operation." Safety science 57 (2013): 129-137. (Year: 2013).*

* cited by examiner

*Primary Examiner* — Carol Wang
(74) *Attorney, Agent, or Firm* — Duft & Bornsen, PC

(57) ABSTRACT

Systems and methods for enhanced collection of training data for machine learning to improve worksite safety and operations. One embodiment is a system with an interface to receive first evaluations of a first scene from a group of trainees, the first scene belonging to safety curriculum content and depicting a worksite with a known hazard that is associated in memory with a hazard profile. The system includes a controller to determine a trusted subgroup of the trainees that correctly identified the known hazard in the first scene. The interface receives second evaluations of a second scene from the trusted subgroup of the trainees that depicts the worksite with an unknown hazard. The controller trains a machine learning function based on the second evaluations from the trusted subgroup of the trainees for automatic identification of hazard indications in the second scene depicting the worksite with the unknown hazard.

20 Claims, 12 Drawing Sheets

ENHANCED COLLECTION OF TRAINING DATA FOR MACHINE LEARNING TO IMPROVE WORKSITE SAFETY AND OPERATIONS

FIELD

The disclosure relates to the field of worksite operation and safety.

BACKGROUND

A large organization or company may have employees take safety training courses to certify their ability to identify and prevent potentially dangerous conditions that may arise in their line of work. Unfortunately, the safety training that is offered may become stagnant, limited, or not comprehensive due to the expense involved with continually updating or creating new safety curriculum content as new worksite issues arise. Additionally, even with mandatory and/or periodic safety courses, the potential for human error at worksites remains a possibility. Companies therefore seek to provide the most comprehensive safety training possible as well as improved worksite safety systems to help detect and prevent safety hazards.

Machine learning is a developing field that promises automation in many applications. However, machine learning generally performs best in applications in which large amounts of training data is available for input. It is prohibitively difficult for companies to implement machine learning for improving a worksite safety system because it would involve a heavy cost in manual work to collect, filter, and classify a large enough amount of training data to be useful for input into the machine learning. Thus, the conventional approach to detecting worksite safety relies on workers physically monitoring the worksite, which is manually intensive and expensive. Moreover, the conventional approach to responding to a potentially unsafe event may be limited by human recall of training content that has not been comprehensively updated.

SUMMARY

Embodiments described herein provide enhanced collection of training data for machine learning to improve worksite safety and operations. Techniques described herein leverage an organization's safety training curriculum process for their personnel to generate improved data training input for a machine learning system. Human evaluators taking a safety class are shown a mixed pattern of situations that are both known to be hazardous and unknown to be hazardous. The example safety scenarios are refined by applying weighted trusts to the human evaluators identifying potential and real safety threats and describing/qualifying those risks as they take safety training courses. Advantageously, these refined examples can then be reused to improve the safety course content. Additionally, the refined examples are input to a machine learning system to improve its output in automatically detecting and responding to safety hazards and risks in real time.

Embodiments described herein further provide a gamification system to incentivize the collection of user-classified data for a machine learning function. The gamification system awards points to users for correctly capturing an object such as a machine or person performing a target action. The gamification system thus establishes users which have relative higher ratings or levels of trust in accurately assessing/capturing situations presented in an environment. A user's score changes the weighting consideration of their input into machine learning relative to their peers, thus refining the input training data through the gamification system.

One embodiment is a worksite safety system that includes an interface configured to receive first evaluations of a first scene from a group of trainees, the first scene belonging to safety curriculum content and depicting a worksite with a known hazard that is associated in memory with a hazard profile. The worksite safety system also includes a safety training controller configured to determine a trusted subgroup of the trainees that correctly identified the known hazard in the first scene based on a match between the first evaluations and the hazard profile. The interface is further configured to receive second evaluations of a second scene from the trusted subgroup of the trainees, the second scene depicting the worksite with an unknown hazard. The safety training controller is further configured to train a machine learning function based on the second evaluations from the trusted subgroup of the trainees for automatic identification of hazard indications in the second scene depicting the worksite with the unknown hazard.

Another embodiment is a method of training a machine learning function for worksite safety. The method includes receiving first evaluations of a first scene from a group of the trainees, the first scene belonging to safety curriculum content and depicting a worksite with a known hazard that is associated in memory with a hazard profile. The method also includes determining a trusted subgroup of the trainees that correctly identified the known hazard in the first scene based on a match between the first evaluations and the hazard profile, and receiving second evaluations of a second scene from the trusted subgroup of the trainees, the second scene depicting the worksite with an unknown hazard. The method also includes training the machine learning function based on the second evaluations from the trusted subgroup of the trainees for automatic identification of hazard indications in the second scene depicting the worksite with the unknown hazard.

Yet another embodiment is non-transitory computer readable medium embodying programmed instructions executed by a processor, wherein the instructions direct the processor to perform a method of training a machine learning function for worksite safety. The method includes receiving first evaluations of a first scene from a group of the trainees, the first scene belonging to safety curriculum content and depicting a worksite with a known hazard that is associated in memory with a hazard profile. The method also includes determining a trusted subgroup of the trainees that correctly identified the known hazard in the first scene based on a match between the first evaluations and the hazard profile, and receiving second evaluations of a second scene from the trusted subgroup of the trainees, the second scene depicting the worksite with an unknown hazard. The method also includes training the machine learning function based on the second evaluations from the trusted subgroup of the trainees for automatic identification of hazard indications in the second scene depicting the worksite with the unknown hazard.

Other example embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific example embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure and are to be construed as being without limitation to such specifically recited examples and conditions. As a result, the disclosure is not limited to the specific embodiments or examples described below, but by the claims and their equivalents.

Figure 1:
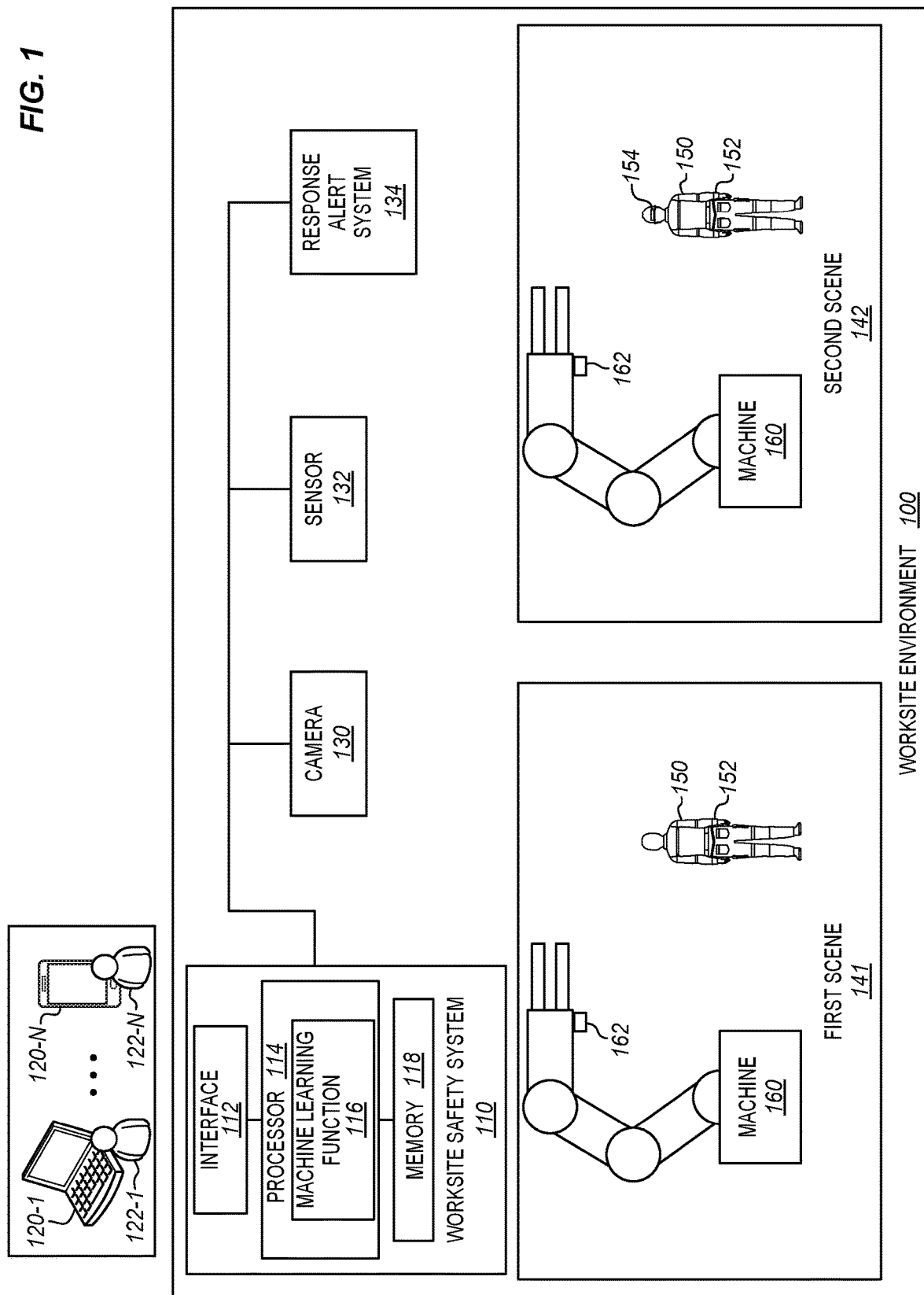
FIG. 1 illustrates a worksite environment in an illustrative embodiment.

FIG. 1 illustrates a worksite environment 100 in an illustrative embodiment. The worksite environment 100 is enhanced with a worksite safety system 110 configured to detect and prevent potentially unsafe conditions in the worksite environment 100. To improve its ability to automatically detect and respond to safety issues, the worksite safety system 110 may receive input from user equipment $120_1 \ldots _N$ operated by respective trainees $122_1 \ldots _N$ taking safety courses regarding the worksite environment 100. The trainees 122 may be employees or technicians of an organization or company that implements mandatory and/or periodic safety training courses to improve safety of the worksite environment 100.

The worksite safety system 110 is configured to refine the assessments provided by the trainees 122 regarding various scenes or scenarios in the worksite environment 100, and to train a machine learning function 116 using the refined data. More particularly, the trainees 122 are prompted to provide answers regarding safety scenarios of the worksite environment 100 as part of a safety course or curriculum content. The worksite safety system 110 performs a series of steps to establish which of the trainees 122 have a relatively higher level of trust in correctly assessing the level of risk in the worksite environment 100.

By processing answers provided by trainees 122 having relatively higher levels of trust, the worksite safety system 110 is configured to mine data for previously unknown or unascertained characteristics of the worksite environment 100 that may pose safety issues. Advantageously, applying high-trust data as input to the machine learning function 116 results in highly accurate automatic detection and intelligent response to safety issues in the worksite environment 100. Additionally, the refined data sets are collected in the course of administrating worksite safety courses, thereby eliminating the cost of hiring specialists to collect, filter, and classify enough training data to be used for using machine learning to improve safety in the worksite environment 100. Still further, in the process of collecting refined data sets, the worksite safety systems 110 helps identify better, more granular worksite examples for humans to assess and refine, thus providing automatic, continuous updates to the safety curriculum content itself for comprehensive, up-to-date safety training and enhanced worksite safety.

The worksite safety system 110 includes an interface 112, one or more processor(s) 114, and memory 118. The interface 112 may comprise a component or device (e.g., transceiver, antenna, etc.) configured to perform wired and/or wireless communication over a network with other systems and devices. The processor 114 represents the internal circuitry, logic, hardware, etc., that provides the functions of the worksite safety system 110. The memory 118 may comprise a computer readable storage medium for data, instructions, applications, etc., accessible by the processor 114.

The processor 114 may implement the machine learning function 116. The machine learning function 116 may be implemented in any combination of hardware, firmware, and/or software operable to implement machine learning techniques. Machine learning generally refers to an automated process capable of parsing input data, learning from the data, and then adapting its output based on its learning. This differs from traditional computer processes where instructions or programming is predefined and explicit such that the same steps are repeated given the same input. That is, rather than having activities defined in advance, the machine learning function 116 may be trained to observe patterns in data and adaptively adjust actions or steps to take over time without explicit hand-coded programming or user intervention/instruction.

The worksite safety system 110 may be communication with one or more camera(s) 130, one or more sensor(s) 132, and a response alert system 134. The camera(s) 130 are generally positioned to have a field of view of the worksite environment 100 to capture visual/audio data of one or more scenes. In this example, the camera 130 records a first scene 141 and a second scene 142 of a technician 150 and machine 160 in the worksite environment 100. As will be described in greater detail below, the first scene 141 may depict a known hazard (e.g., technician is not wearing head protection near the machine 160), and the second scene 142 may depict an unknown hazard (e.g., technician is wearing helmet 154 but other safety issues are possible). The first scene 141 and second scene 142 may represent images captured by camera(s) 130 at different times and/or at different locations in the worksite environment 100.

The sensor(s) 132 may additionally or alternatively provide data for the first scene 141 and/or second scene 142. The sensor 132 may include any number of devices configured to capture other types of environmental data of the worksite environment 100. Examples of environmental data include, but are not limited to, temperature, humidity, barometric pressure, pollution or chemical levels, relative locations of technicians 150 and machines 160, etc. Data captured by camera(s) 130 and sensor(s) 132 may be transmitted to the worksite safety system 110 via interface 112.

Additionally, the technician 150 may wear a wearable sensor 152 that includes any device configured to capture/transmit biological data of the technician 150 for the worksite safety system 110. Examples of biological data include, but are not limited to, heart rate, respiration, blood pressure, body temperature, etc. Alternatively or additionally, the wearable sensor 152 may include tactile feedback articles (e.g., gloves) configured to detect and report touch/pressure data experienced by the technician 150. Similarly, the machine 160 may include a machine sensor 162 that includes any device configured to capture/transmit machine data of the machine 160 for the worksite safety system 110. Examples of machine data include, but are not limited to, revolutions per minute, hydraulic pressure, time to pressurize, force applied, machine cycle, amps drawn, etc.

The response alert system 134 includes any system configured to respond to a detected safety event. Example functions of the response alert system 134 includes, but is not limited to, calling emergency services, cutting power to the machine 160, highlighting (e.g., via a display or laser pointer) a location of the safety issue in the worksite environment 100, and/or sounding an alarm. Alternatively or additionally, the response alert system 134 may provide appropriate contextual information for personnel responding to the safety issue such as alerting those in the area to a location of nearby safety equipment related to the event (e.g., location of defibrillators, a type of work glove, tool for the machine 160, etc.).

It will be appreciated that the worksite environment 100 is an example environment for discussion purposes and that the features of the worksite safety system 110 described herein may be employed in alternative environments and applications. Illustrative examples and details of the operation of the worksite safety system 110 are discussed below.

Figure 2:
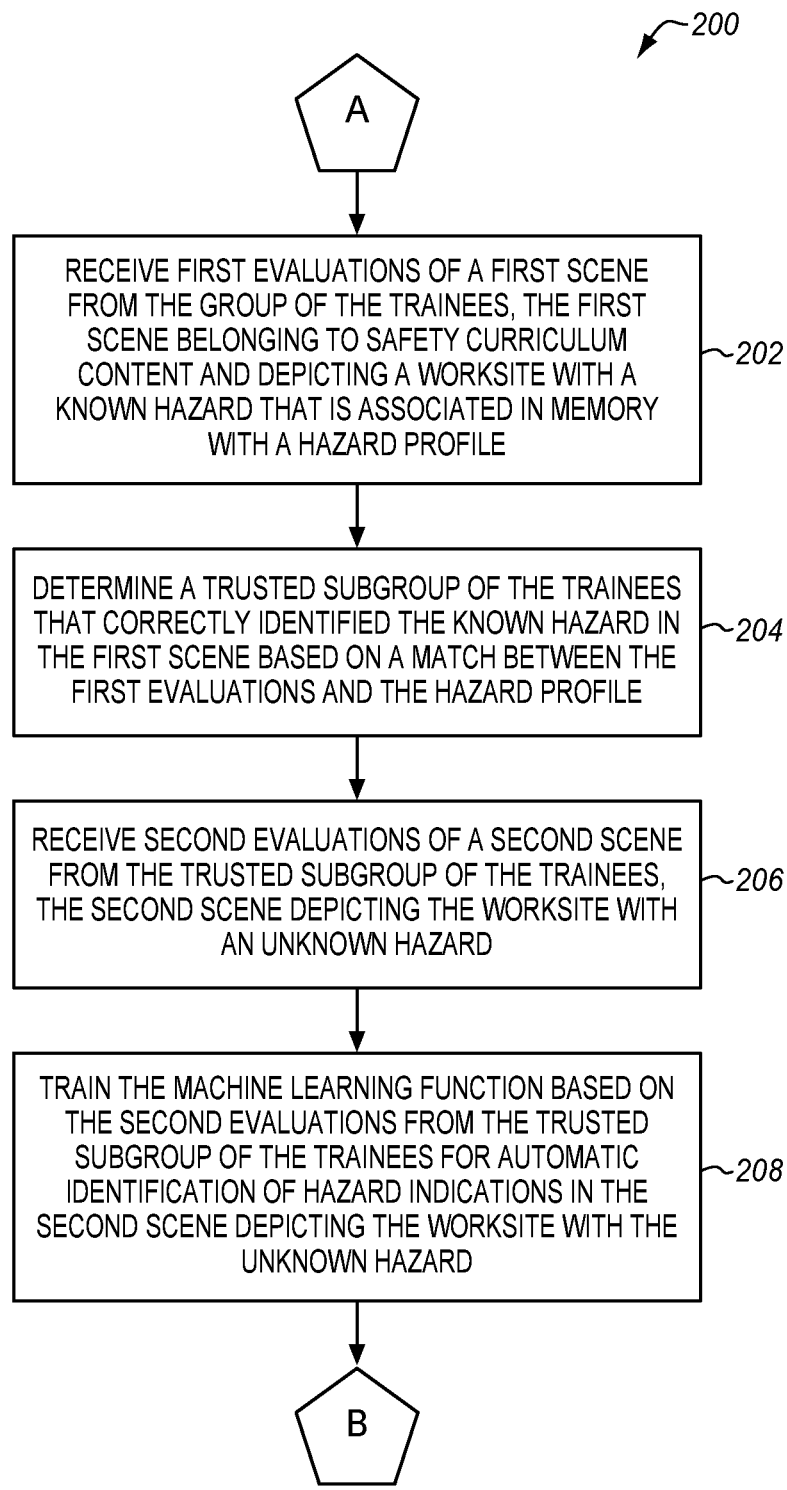
FIG. 2 is a flowchart illustrating a method of refining training data for a machine learning function to enhance worksite safety in an illustrative embodiment.

FIG. 2 is a flowchart illustrating a method 200 of refining training data for a machine learning function to enhance worksite safety in an illustrative embodiment. The methods herein may be described with respect to the worksite environment 100 and worksite safety system 110 of FIG. 1, although one skilled in the art will recognize that the methods may be performed with other environments and systems. The steps of the methods described herein are not all inclusive, may include other steps not shown, and may also be performed in alternative orders.

In step 202, the worksite safety system 110 receives first evaluations of a first scene 141 from a group of the trainees 122, the first scene 141 belonging to safety curriculum content and depicting a worksite with a known hazard that is associated in memory 118 with a hazard profile. In one embodiment, the first scene 141 of the safety curriculum content includes video content or image data recorded by one or more cameras 130. Alternatively or additionally, the first scene 141 may comprise other types of sensor data such as sound or various environmental metrics available via sensors 132, wearable sensors 152, and/or machine sensors 162. The first scene 141 may be displayed on respective user devices 120 or in a centralized setting such as a classroom.

In step 204, the worksite safety system 110 determines a trusted subgroup of the trainees 122 that correctly identified the known hazard in the first scene based on a match between the first evaluations and the hazard profile. The hazard profile may include data describing the ascertained characteristics (e.g., image data, sensor data, etc.) of the known hazard. A known hazard may have been previously established or ascertained as hazardous by expert analysis or previous trainee evaluations. Thus, the worksite safety system 110 may establish which of the trainees 122 have a threshold level of trust based on their correct identification of hazardous characteristics as defined in the predefined hazard profile. An evaluation or identification of hazardous characteristics may include any number of response formats including text, audio, multiple choice, interactive selection of objects on the display, etc. that may be matched with data in a hazard profile of a known hazard.

The trusted subgroup may be established by processing multiple rounds of scenes with known hazards and corresponding evaluations. That is, the worksite safety system 110 may determine which of the trainees 122 have relatively higher levels of trust after processing multiple rounds of answers provided by the trainees 122 to various first scenes 141 depicting various known hazards. Thus, it may be understood that term "first" in first scene 141, first evaluations, etc. may refer to a relation to a known hazard rather than to a single instance of successful training.

In step 206, the worksite safety system 110 receives second evaluations of a second scene 142 from the trusted subgroup of the trainees, the second scene 142 depicting the worksite with an unknown hazard. The unknown hazard, unlike the known hazard, is a scenario or situation in the worksite environment 100 which has not yet been definitively established as hazardous or non-hazardous. For example, the unknown hazard may be a condition not previously analyzed by expert analysts or trainees 122 as being hazardous. Alternatively or additionally, the unknown hazard may depict an ambiguous or "gray area" edge case for which different trainees 122 or even expert analysists may disagree contains a potentially unsafe condition. Embodiments for selecting or generating the unknown hazard to present to the trusted subgroup of the trainees will be later described. In some embodiments, the worksite safety system 110 receives multiple rounds of answers provided by the trusted subgroup to various second scenes 142 depicting various unknown hazards. Thus, it may be understood that term "second" in second scene 142, second evaluations, etc. may refer to a relation to an unknown hazard rather than to a second single instance of training.

In step 208, the worksite safety system 110 trains the machine learning function 116 based on the second evaluations from the trusted subgroup of the trainees 122 for automatic identification of hazard indications in the second scene 142 depicting the worksite with the unknown hazard. By training the machine learning function 116 with data provided by trainees 122 having relatively higher levels of trust, the method 200 improves the fidelity of the training set while teaching/training the individual trainees 122. This leverages an organization's safety training curriculum process for their personnel to generate large amounts of refined data training input for machine learning to improve safety in the worksite environment 100 without the cost of hiring specialists to collect, filter, and classify the training data.

Figure 3:
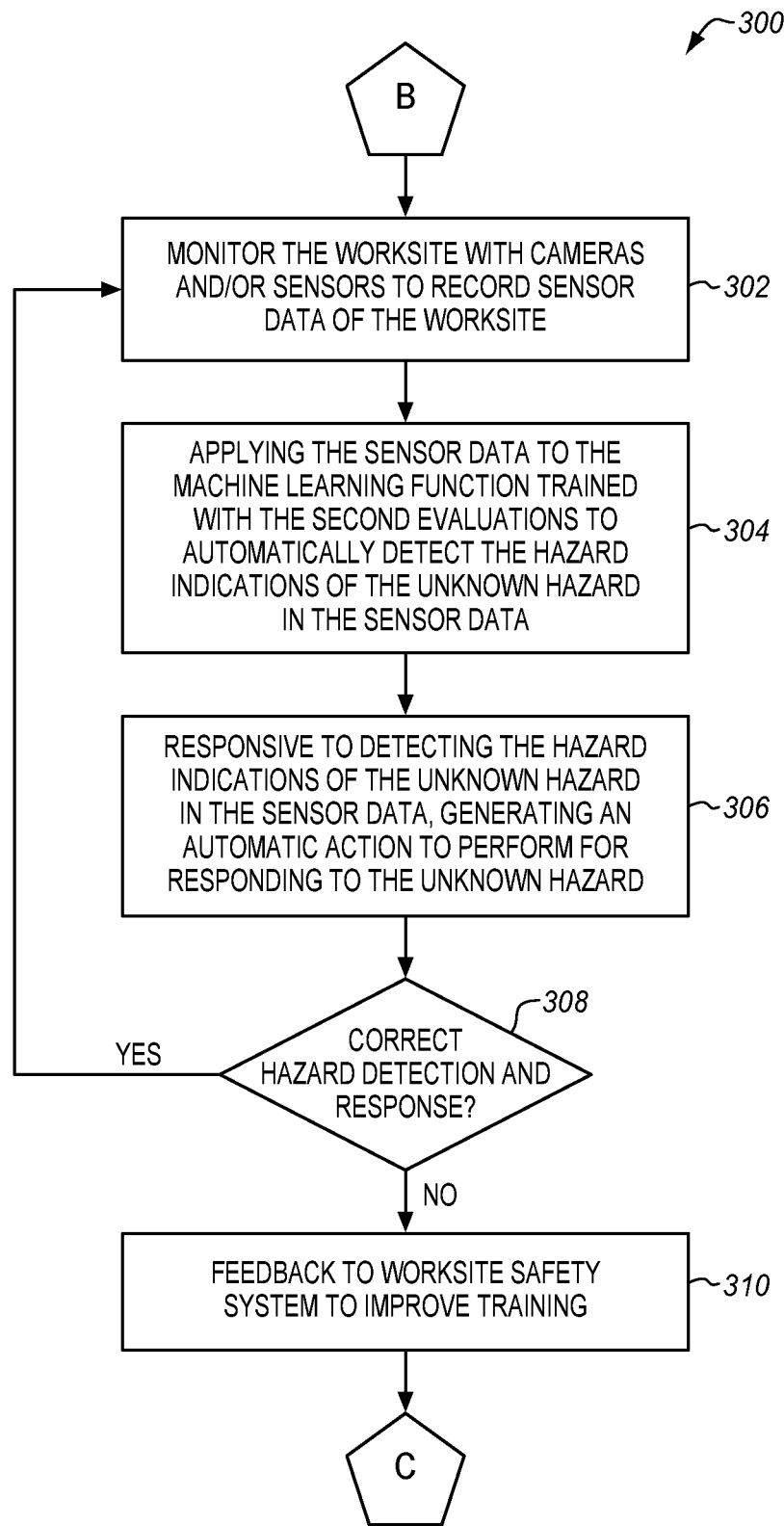
FIG. 3 is a flowchart illustrating a method of applying refined training data to a machine learning function for worksite safety in an illustrative embodiment.

FIG. 3 is a flowchart illustrating a method 300 of applying refined training data to a machine learning function for worksite safety in an illustrative embodiment. In step 302, the one or more camera(s) 130 and/or one or more sensor(s) 132 monitor the worksite environment 100 to record sensor data. Sensor data may therefore include image/video data obtained via camera(s) 130 and/or other types of sensor data obtained via sensor(s) 132, wearable sensors 152, and/or machine sensors 162 as previously described.

In step 304, the worksite safety system 110 applies the sensor data to the machine learning function 116 trained with the second evaluations to automatically detect the hazard indications of the unknown hazard in the sensor data. And, in step 306, in response to detecting the hazard indications of the unknown hazard in the sensor data, the worksite safety system 110 generates an automatic action to perform for responding to the unknown hazard. Thus, the worksite safety system 110 uses the high-trust input of trainees 122 to improve its machine learning output in automatically detecting and responding to safety hazards and risks in the worksite environment 100 in real time.

In step 308, the worksite safety system 110 determines whether the detection of the hazard and action(s) taken in response were correct. For example, the worksite safety system 110 may receive input regarding the effectiveness of its automatically generated machine learning output. If the hazard detection and response is correct, the method 300 may return to continuously perform steps 302-306 for detecting and responding to potential hazards in the worksite environment 100. Otherwise, if the hazard detection and response is inadequate, the method 300 may proceed to step 310 where the worksite safety system 110 receives feedback for improving its training data collection and/or safety curriculum content.

Figure 4:
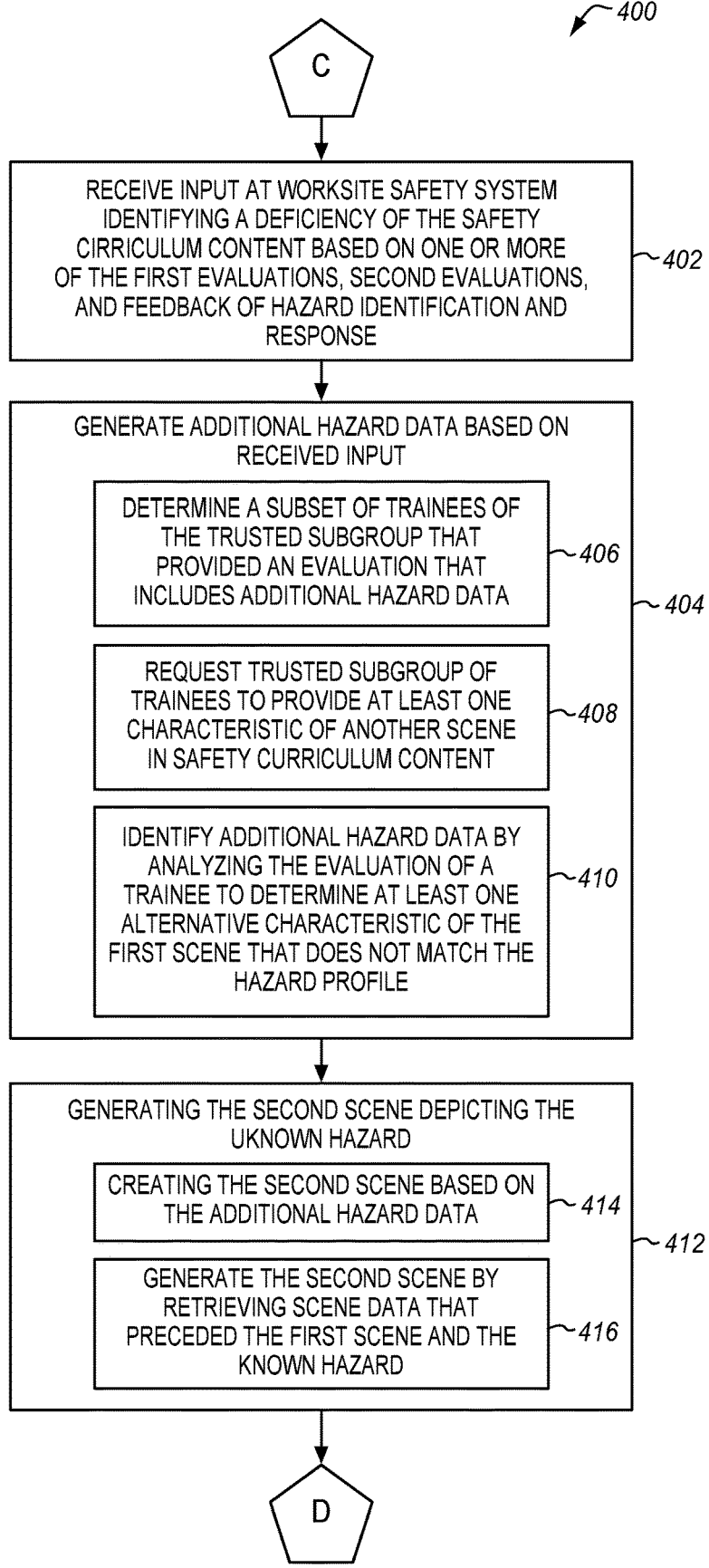
FIG. 4 is a flowchart illustrating a method of refining training data for a machine learning function to enhance worksite safety in another illustrative embodiment.

FIG. 4 is a flowchart illustrating a method 400 of refining training data for a machine learning function to enhance worksite safety in another illustrative embodiment. In step 402, the worksite safety system 110 receives input identifying a deficiency of the safety curriculum content based on one or more of the first evaluations, seconds evaluations, and feedback of hazard identification and response. In step 404, the worksite safety system 110 generates additional hazard data based on received input. Step 404 may include one or more of steps 406-410 described below.

In step 406, the worksite safety system 110 determines a subset of the trusted subgroup of the trainees 122 that provided an evaluation that includes additional hazard data. Such additional hazard data may be obtained, for example, in step 408 in which the trusted subgroup of trainees 122 are requested to provide at least one characteristic of another scene in the safety curriculum content and/or worksite environment 100. Alternatively or additionally, in step 410, the worksite safety system 110 may identify additional hazard by analyzing the evaluation of a trainee to determine at least one alternative characteristic of the first scene 141 that does not match the hazard profile. In this way, the worksite safety system 110 may use evaluation answers provided by one or more trainees 122 that have been established as consistently providing accurate input to mine for additional data in the safety curriculum content and/or worksite environment 100 that has not yet been ascertained.

In step 412, the worksite safety system 110 generates the second scene 142 depicting the unknown hazard. Step 412 may include one or more of steps 414-416 described below. In step 414, the second scene 142 may be created based on the additional hazard data. For instance, after obtaining additional hazard data from one or more trusted trainees 122, the worksite safety system 110 may insert the characteristics of the additional hazard data into a new scenario to create the second scene 142. Alternatively or additionally, the second scene 142 may be generated by retrieving scene data that preceded the first scene 141 and the known hazard. For example, the worksite safety system 110 may automatically retrieve image/sensor data that preceded a known hazard to mine for precursors or an unknown hazard leading up to a hazardous event.

Figure 5:
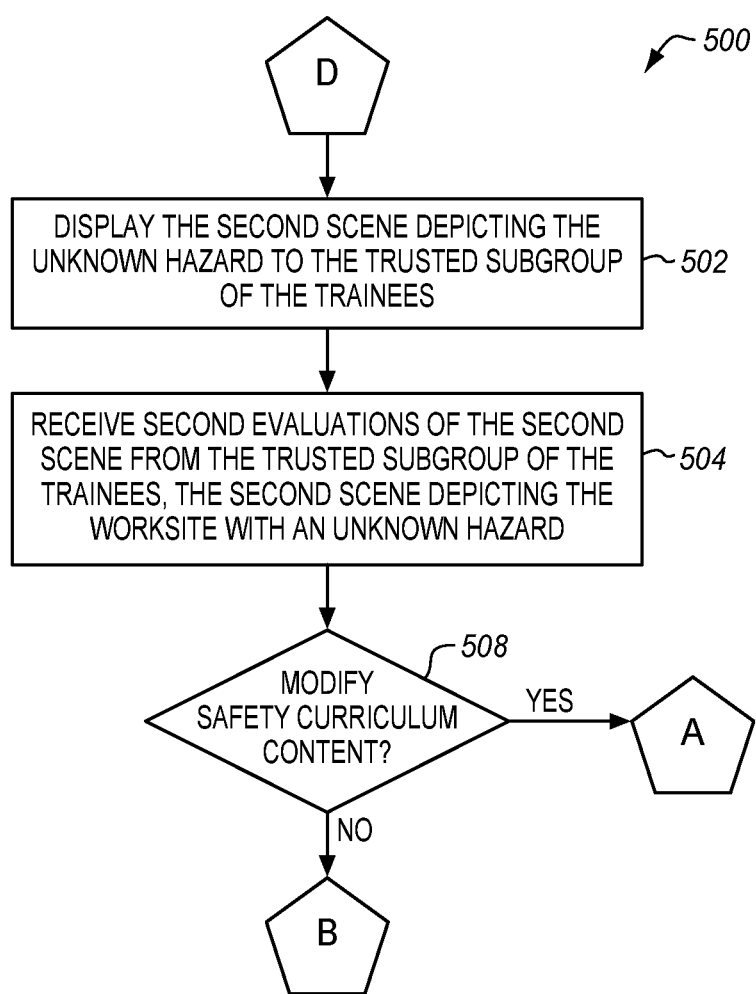
FIG. 5 is a flowchart illustrating a method of modifying safety curriculum content in an illustrative embodiment.

FIG. 5 is a flowchart illustrating a method 500 of modifying safety curriculum content in an illustrative embodiment. In step 502, the second scene 142 depicting the unknown hazard is displayed to the trusted subgroup of the trainees 122. And, in step 504, the worksite safety system 110 receives second evaluations of the second scene 142 from the trusted subgroup of the trainees 122, wherein the second scene 142 depicts the worksite with the unknown hazard.

In step 508, the worksite safety system 110 determines whether to modify the safety curriculum content. For example, the worksite safety system 110 may determine based on the second evaluations (e.g., high-trust feedback related to an unknown hazard) that the safety curriculum content may be improved by being changed to include a safety training example or scenario that covers the second scene 142. Over time, if a threshold level of certainty is established for a second scene 142 (e.g., by calculating a rating score based on weighted user trust and/or overlapping agreement among trainee feedback), the worksite safety system 110 may convert the second scene 142 into a first scene 141 and establish a hazard profile for it that becomes part of the standard course content used to train future trainees.

If, in step 508, it is determined to modify the safety curriculum content, the method 500 may return to step 202 of method 200 to continue to refine machine learning input using the safety curriculum content. Otherwise, if in step 508, it is determined to not modify the safety curriculum content, the method 500 may return to step 302 of method 300 to continue to automatically detect and respond to potential hazards in the worksite environment 100 using inputs via the current version of the safety curriculum content. Thus, methods 200-500 provide a technical benefit in continuously adapting safety training courses and machine learning input in an interrelated manner.

Figure 6:
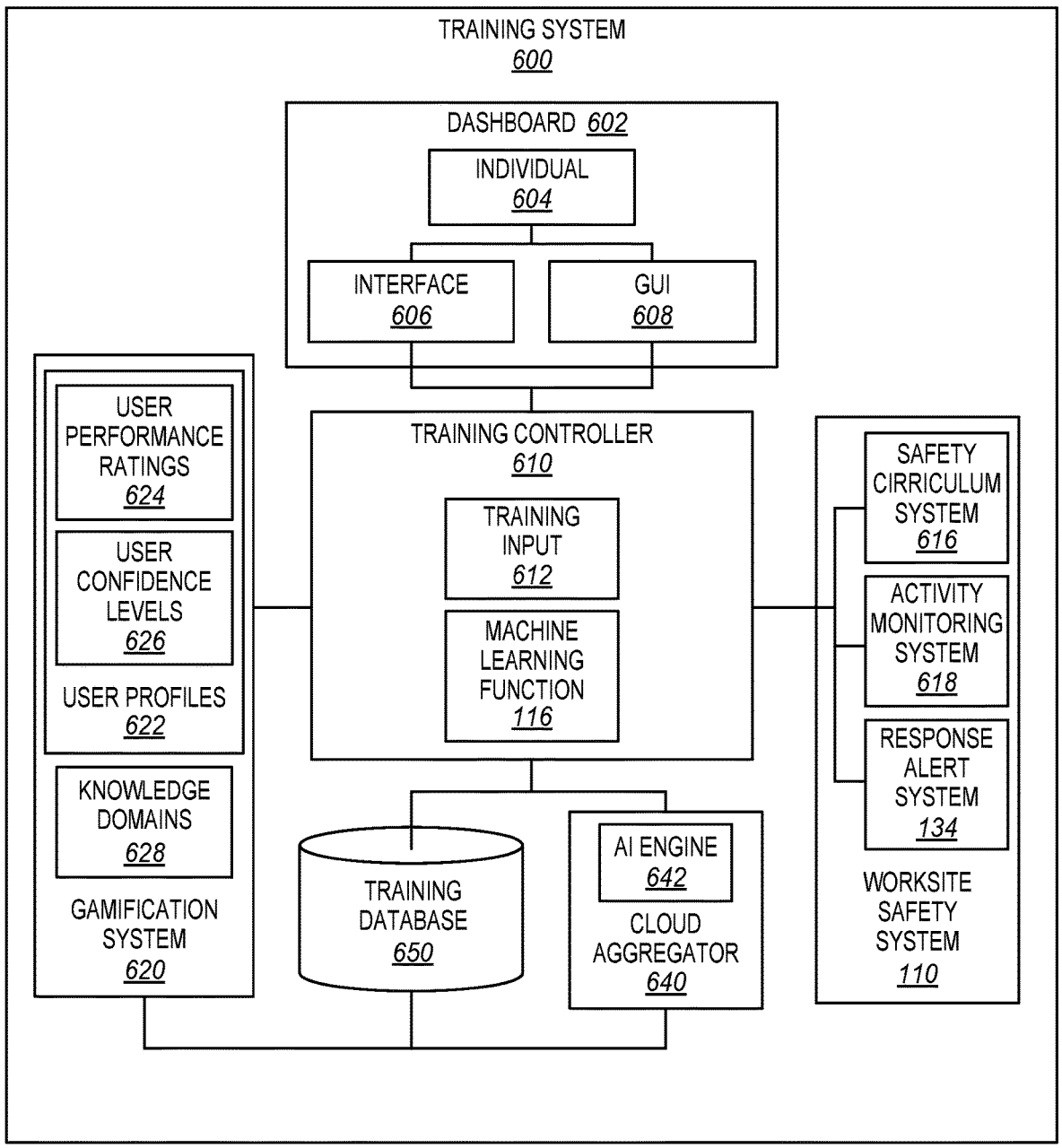
FIG. 6 is a block diagram of a training system in an illustrative embodiment.

FIG. 6 is a block diagram of a training system 600 in an illustrative embodiment. The training system 600 includes a training controller 610 that implements or interfaces with one or more components of the worksite safety system 110 to perform machine learning techniques for automation at a worksite. For example, the worksite safety system 110 may include one or more of a safety curriculum system 616, activity monitoring system 618 (e.g., cameras 130, sensors 132, wearable sensors 152, etc.), and response alert system 134 to implement functions previously described.

The training controller 610 may additionally or alternatively implement or interface with a gamification system 620 configured to incentivize user input and classification of training input 612 to be applied to the machine learning function 116. The gamification system 620 stores user profiles 622 that tracks, for individual users or players, user performance ratings 624 and user confidence levels 626 in accurately capturing training data for machine learning applications. As described in greater detail below, the gamification system 620 may manage a point-based system that encourages targeted data collection to use as refined input for machine learning. Additionally, the gamification system 620 may manage groups of users within knowledge domains 628 that coordinates training data collection according to an area of expertise to which users may belong. For example, a user or employee belonging to an engineering group within an organization may have increased weight applied for collected data related to their engineering expertise.

The training controller 610 may receive sensor data input from an individual 604 via a dashboard 602 operated by an employee or supervisor of an organization. The dashboard 602 may include an interface 606 and/or graphical user interface (GUI) 608 to communicate and display data. The operator may initialize the training system 600 by connecting with the training controller 610 and accessing baseline data. Encrypted keys along with baseline data may be sent to a cloud aggregator 640 that unlocks and requests profiled data, aggregates data, and generates the latest course or game materials. For example, the safety curriculum system 616 and/or gamification system 620 may generate data capturing instructions for the user based on their profile data. Baseline data for an individual user may be established based on their user profile 622 and data from other similar profiles (e.g., users belonging to the same knowledge domain 628).

After sending data capturing instructions for the user to classify a scenario or object in an environment, the training controller 610 receives the captured data and feeds it back to the cloud aggregator 640 to be observed, sorted, and tagged. An Artificial Intelligence (AI) engine 642 in the cloud aggregator 640 updates logic tree changes to reflect learnings based on human evaluation of the captured data. The AI engine 642 may compare its own response to that of humans averaged and weighted across trainees to simultaneously improve fidelity of a training set while administering course material as previously described. A training database 650 stores collected data for analyzing patterns for continuously improving performance. The training database 650 may store video, image, audio, or other type of sensor data for enhancing training data sets as deficiencies arise or enhancements are identified. For example, an end user may be directed, as a part of their safety training, to go and find potential examples of a given training scenario or environmental condition that may be fed back to the training controller 610 for rating and processing and incorporated into the safety curriculum system 616 via the cloud aggregator 640 and training database 650. Sensor data sent to the training controller 610 is aggregated and sorted with other recorded data to continuously build and refine course and game materials. Game or course material may be optimized relative to needs of a particular role in an environment and compared with like populations. Adjustments to improve a game or course may be made and sent to users as future training is requested. The response alert system 134 analyzes actions taken based on escalation level of the event at hand to learn what actions to take.

Figure 7:
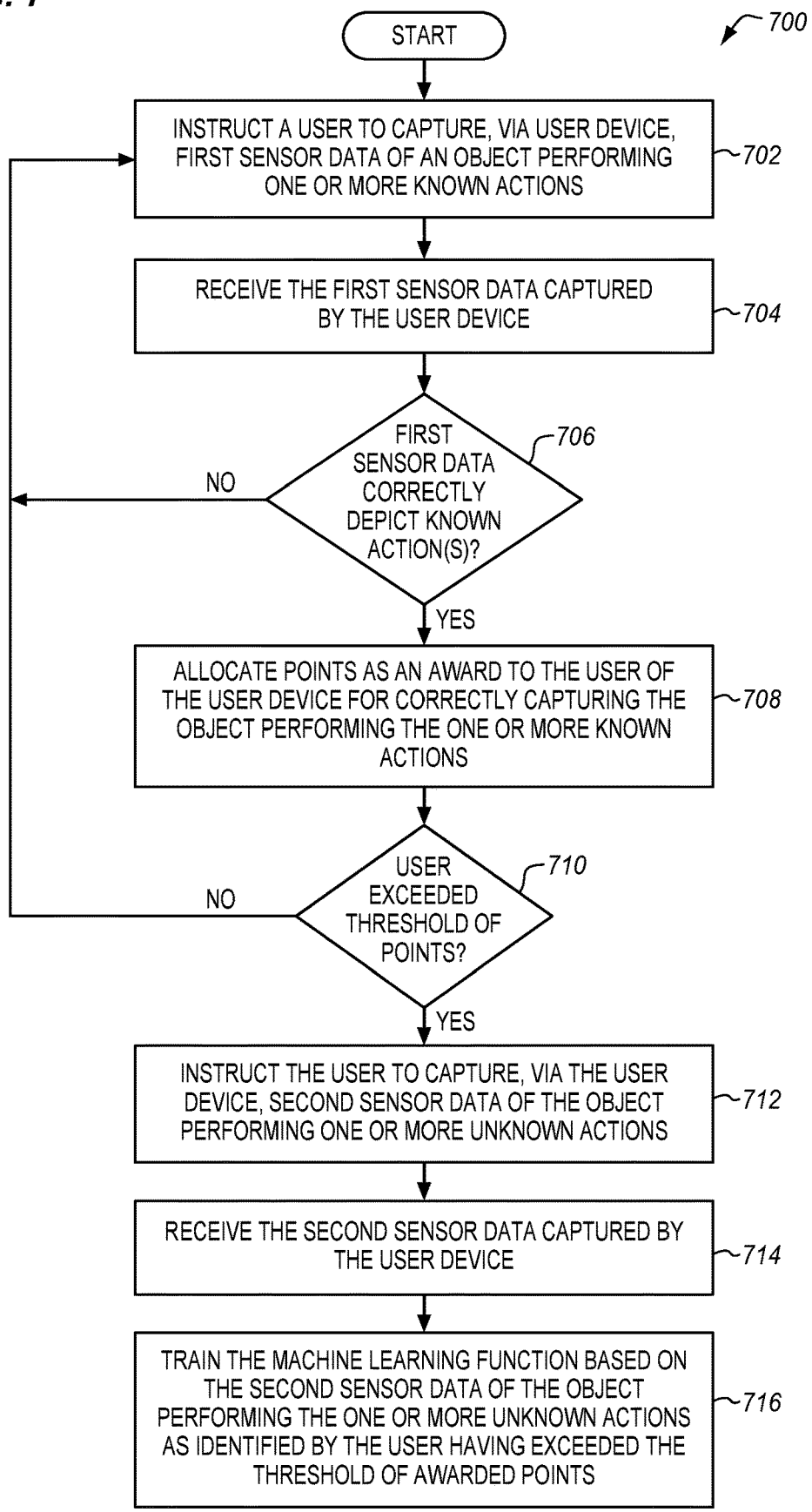
FIG. 7 is a flowchart illustrating a method of collecting training data for a machine learning function to enhance worksite operations in an illustrative embodiment.

FIG. 7 is a flowchart illustrating a method 700 of collecting training data for a machine learning function to enhance worksite operations in an illustrative embodiment. The methods herein may be described with respect to the training system 600, although one skilled in the art will recognize that the methods may be performed with other environments and systems. In step 702, the training controller 610 instructs a user, to capture, via user device, first sensor data of an object performing one or more known actions. The user device may include, for example, personal computers, laptops, smartphones, or other devices/sensors. Known actions may have been previously established or ascertained by expert analysis or previous user/player input.

In step 704, the training controller 610 receives (e.g., via interface 606) the first sensor data captured by the user device. In step 706, the training controller 610 determines whether the first sensor data captured by the user device correctly depicts the object performing the one or more known actions. If the first sensor data does not correctly depict the known action, the method 700 may return to step 702 to perform another round of collecting sensor data related to known actions. Otherwise, the method 700 may proceed to step 708.

In step 708, the training controller 610 allocates points as an award to the user of the user device for correctly capturing the object performing the one or more known actions. The awarded points may be associated with the user profile 622 or user performance ratings 624 in the gamification system 620 and be visually displayed to the user via the user device. Points may be awarded based on relative difficulty of capturing the object performing a target action and provide a basis of competition among a population of users. In this way, a population of users are incentivized to provide large amounts of refined data training input for machine learning to improve worksite operations without the cost of hiring specialists to collect, filter, and classify the training data.

Thus, the training system 600 may implement a point collection system to track use achievement among a population or sub-population of users. For example, points may be awarded to users to achieve training credit, earn credentials or badges, rank amongst peers of a group (e.g., engineering team), provide geo-temporal incentives and/or domain-specific incentives for increased alertness for specific domains, and/or achieve specific data collection from a targeted user base. The incentives may be driven by backend machine learning training model gaps or fidelity improvements. Thus, the training system 600 is able to incentivize end users to acquire, identify, and provide machine learning training data.

In step 710, the training controller 610 determines whether the user of the user device has exceeded a threshold of awarded points. If the user has not exceeded the point threshold, the method 700 may return to step 702 to perform additional rounds of collecting sensor data related to known actions. Otherwise, if the user has exceeded the point threshold, the method 700 proceeds to step 712.

In step 712, the training controller 610 instructs the user to capture, via the user device, second sensor data of the object performing one or more unknown actions. Unlike a known action, an unknown action may comprise an action performed by the object which has not yet been definitively established by the training system 600. For example, the unknown action may be an action not previously established by expert analysts or a user population. Alternatively or additionally, the unknown action may depict an ambiguous or "gray area" edge case for which different players or expert analysts may disagree constitutes behavior that defines the target action.

In step 714, the training controller 610 receives (e.g., via interface 606) the second sensor data captured by the user device. And, in step 716, the training controller 610 trains the machine learning function 116 based on the second sensor data of the object performing the one or more unknown actions as identified by the user having exceeded the threshold of awarded points. Thus, the method 700 improves the fidelity of the training set by incentivizing users to collect and classify training data with a point-based game. Additionally, the training sets collected and applied to machine learning are advantageously refined in the gamification system 620 by using inputs from players that have been qualified in the game as having a level of experience in identifying target actions that occur in an environment.

Figure 8:
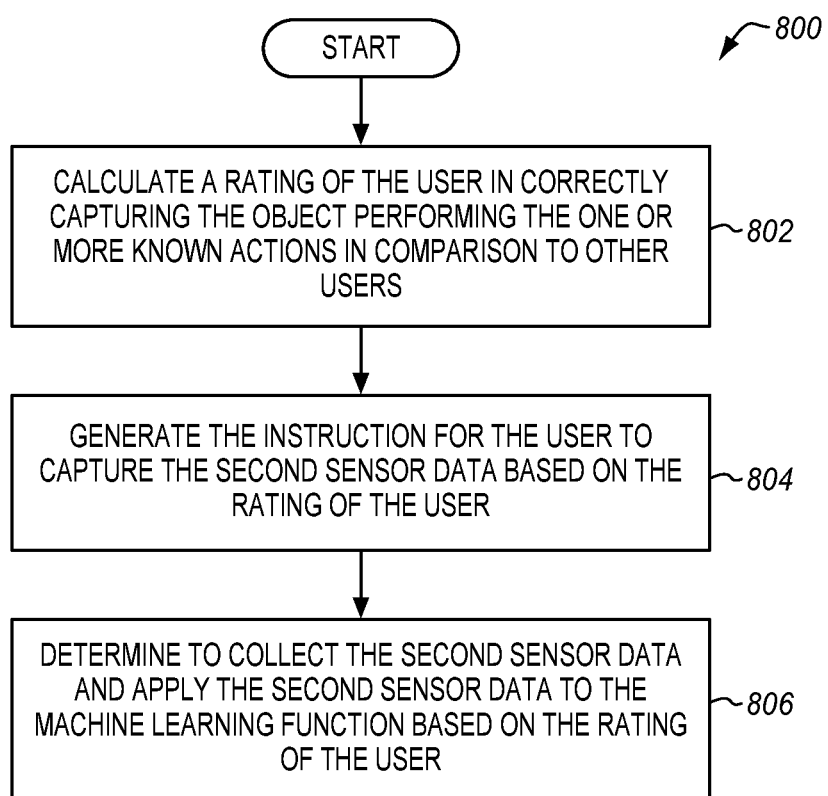
FIG. 8 is a flowchart illustrating a method for determining to apply sensor data to a machine learning function in an illustrative embodiment.

FIG. 8 is a flowchart illustrating a method 800 for determining to apply sensor data to a machine learning function in an illustrative embodiment. In step 802, the training controller 610 calculates a rating of the user in correctly capturing the object performing the one or more known actions in comparison to other users. In step 804, the training controller 610 generates an instruction for the user to capture the second sensor data based on the rating of the user. For example, in one embodiment, the instructions request the user to capture the second sensor data with a target sensor. And, in step 806, the training controller 610 determines to collect the second sensor data and apply the second sensor data to the machine learning function 116 based on the rating of the user. For example, for a user with a high rating (e.g., cumulative points exceed a threshold), the training controller 610 may apply increased weighting to classification/input from that user for generating machine learning training data to automatically detect unknown or undefined action that occurs in an environment. Conversely, users with relatively low ratings may have decreased weighting or input that is discarded for generating machine learning training data. Advantageously, training data is refined by the gamification and rating process.

Figure 9:
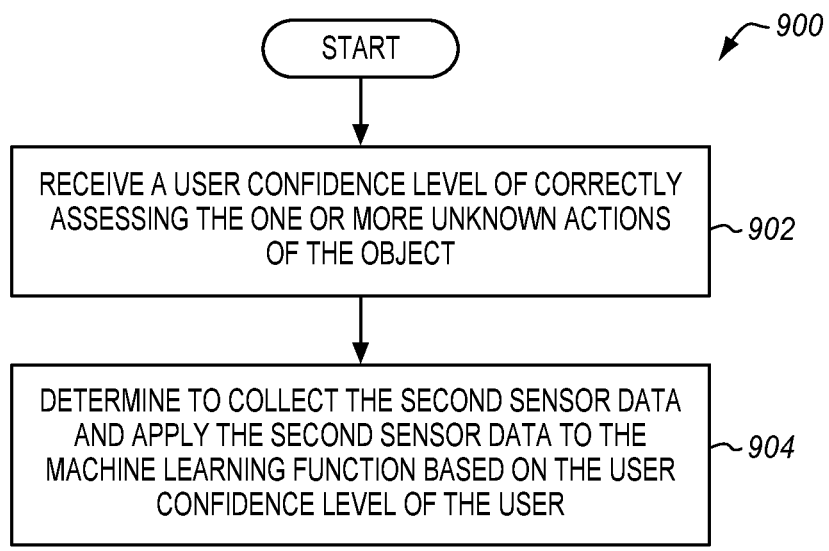
FIG. 9 is a flowchart illustrating a method for determining to apply sensor data to a machine learning function in another illustrative embodiment.

FIG. 9 is a flowchart illustrating a method 900 for determining to apply sensor data to a machine learning function in another illustrative embodiment. In step 902, the training controller 610 receives (e.g., via interface 606) a user confidence level of correctly assessing the one or more unknown actions of the object. And, in step 904, the training controller 610 determines to collect the second sensor data and apply the second sensor data to the machine learning function 116 based on the user confidence level of the user. In some embodiments, the training controller 610 determines whether to collect/apply a user's second sensor data submission based on a combination of the rating and the user confidence level of the user. Thus, machine learning training data is refined taking into account relative levels of user confidence in correctly classifying data through a gamification technique.

Figure 10:
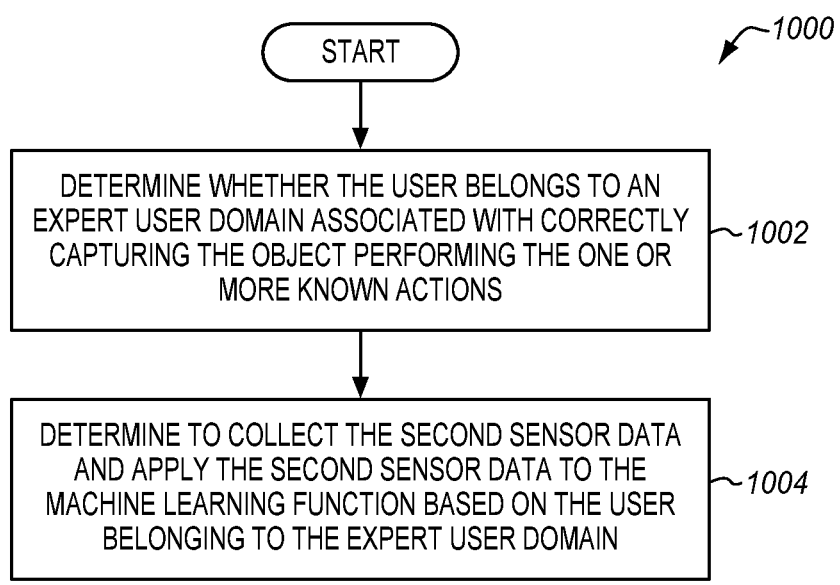
FIG. 10 is a flowchart illustrating a method for determining to apply sensor data to a machine learning function in yet another illustrative embodiment.

FIG. 10 is a flowchart illustrating a method 1000 for determining to apply sensor data to a machine learning function in yet another illustrative embodiment. In step 1002, the training controller 610 determines whether the user belongs to an expert user domain associated with correctly capturing the object performing the one or more known actions. And, in step 1004, the training controller 610 determines to collect the second sensor data and apply the second sensor data to the machine learning function 116 based on the user belonging to the expert user domain. Advantageously, machine learning training data may be refined according to various ability levels of a user in classifying a particular scenario.

Figure 11:
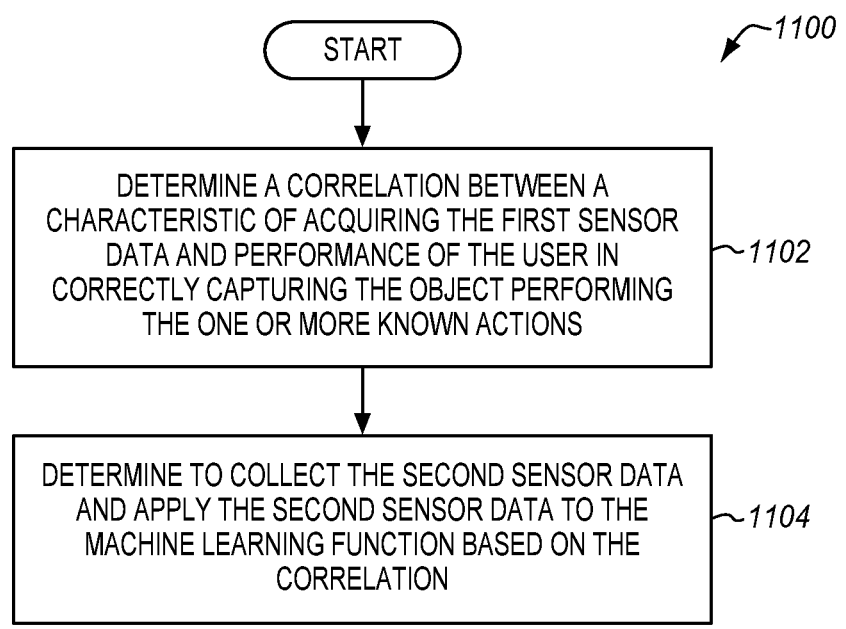
FIG. 11 is a flowchart illustrating a method for determining to apply sensor data to a machine learning function in still another illustrative embodiment.

FIG. 11 is a flowchart illustrating a method 1100 for determining to apply sensor data to a machine learning function in still another illustrative embodiment. In step 1102, the training controller 610 determines a correlation between a characteristic of acquiring the first sensor data and performance of the user in correctly capturing the object performing the one or more known actions. For example, the characteristic may include a location of acquiring the first sensor data, a timing of acquiring the first sensor data, and/or a sensor type used to collect the first sensor data. And, in step 1104, the training controller 610 determines to collect the second sensor data and apply the second sensor data to the machine learning function 116 based on the correlation. Therefore, machine learning training data may be refined by applying weights to user input based on correlating factors that tend to corroborate the user's classification as having increased or decreased likelihood of accuracy.

Figure 12:
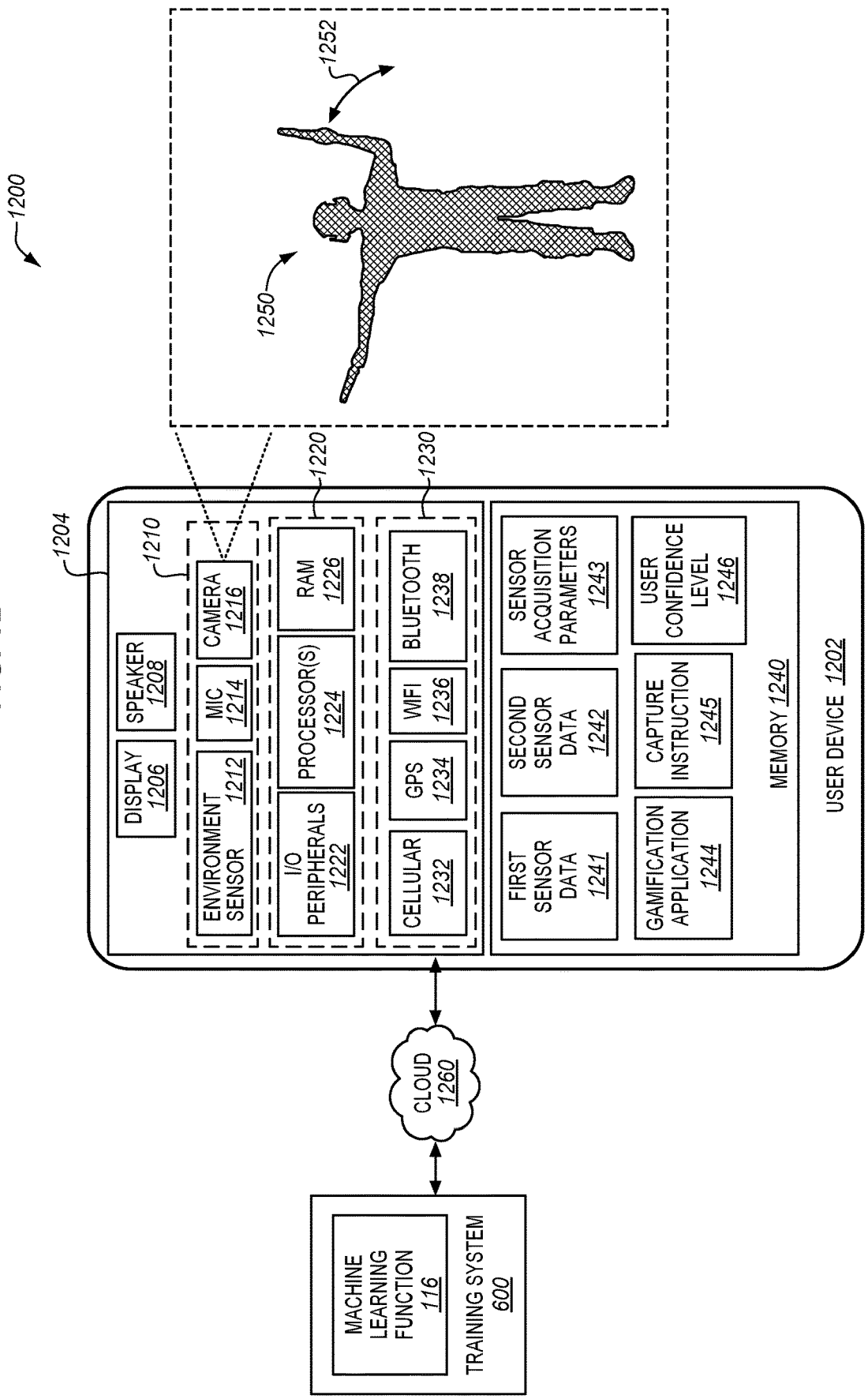
FIG. 12 illustrates an environment for capturing training data with a user device in an illustrative embodiment.

FIG. 12 illustrates an environment 1200 for capturing training data with a user device 1202 in an illustrative embodiment. The user device 1202 may include a smartphone with hardware components 1204 such a display 1206 operable to receive touch screen input and a speaker 1208 to project sound. The user device 1202 may also include sensor components 1210 such as an environment sensor 1212 to capture one or more characteristics of the environment 1200, microphone 1214 to capture audio data, and camera 1216 to capture image data and/or video data.

In this example, the camera 1216 captures an object 1250 (e.g., aircraft marshaller) performing a target action 1252 (e.g., signaling an aircraft to turn left). Data captured by the sensor components 1210 may be stored in memory 1240 of the user device 1202 as first sensor data 1241 or second sensor data 1242. For instance, instead of imagery, the user device 1202 may collect audio of machinery in attempt to capture a particular target action (e.g., operating with bearing failure, excessive cutter wear, etc.). Alternatively or additionally, the environment sensor 1212 may include a vibration sensor to collect vibration data (e.g., captured by resting the user device 1202 on a machine) or a thermal sensor to collect thermal data (e.g., for dent detection in a fuselage of an aircraft).

The memory 1240 may further store sensor acquisition parameters 1243 configured to correlate the collection of sensor data with various characteristics. The sensor acquisition parameters 1243 may facilitate a correlation that is based on the location of sensor acquisition, the time of sensor acquisition (e.g., time of day relative to breaks, arrivals, departures, etc. which indicate periods of user fatigue or preoccupation), and/or the type of sensor acquisition (e.g., image, audio, thermal, etc.). The training system 600 and/or user device 1202 may correlate the sensor acquisition parameters 1243 with user trust, performance, or reliability in correctly capturing the target action 1252.

The user device 1202 may also implement a gamification application 1244 configured to incentivize sensor data collection for the training system 600. The gamification application 1244 may communicate with the training system 600 via cloud 1260 to implement a gamification system for a population of users across multiple servers over the Internet and/or other networks. That is, gamification for the machine learning function 116 may be implemented across a platform that is both tailored to the user device 1202 and yet common to a plurality of user devices managed by the training system 600. As an example, the gamification application 1244 may generate, or receive from the training system 600, capture instructions 1245 tailored to a performance history of the user. For instance, the user may be provided with a query that at attempts to influence acquisition choices (e.g., presented with a series of sensor data acquisitions with a targeted sensor and domain such as image, sound, etc.). The tailored capture instructions 1245 may be used to assess user sway and correlate sway relative to areas of potential ambiguity (e.g., location, time of day, domain type, etc.).

The gamification application 1244 may also prompt for, or receive, a user confidence level 1246 of the acquired sensor data and/or sensor domain. For example, the user device 1202 may display a slider bar that is selectable between zero and one hundred percent. The user confidence level 1246 may be adjusted based on the user's historical performance, expertise domain, and or preference for the sensor data and domain under acquisition. If user confidence is low or below a threshold, the gamification application 1244 may provide a targeted comparison of existing sensor data that allows a user to perform a comparison. If user confidence is consistently low, the gamification application 1244 may present the user with three or more options, wherein at least one option includes the desired sensor signal and at least one other option includes the desired sensor signal in a slightly altered way.

The gamification application 1244 may provide user anonymity for the training system 600 where each user is conferred trust based on merit. This supports expansion into new areas where a user may be willing to take increased risks in incorrectly classifying information in the environment 1200. Alternatively or additionally, a user and associated collection profile may be published within a community or knowledge domain to establish performance-based brand or status. This supports loss aversion and encourages users to be careful about their classifications of the environment 1200. To improve user performance with positive reinforcement, the gamification application 1244 may provide an initial test, and then reinforce successful choices by showing evidence of reasons they might have made a particular classification choice.

To communicate with the training system 600, the user device 1202 may include network components 1230 such as a cellular communication interface 1232, global positioning satellite (GPS) 1234, WiFi 1236, and Bluetooth 1238. The user device 1202 also includes hardware 1220 such as one or more processor(s) 1224 configured to process computer-executable instructions to control the operation of the user device 1202, Input/Output (I/O) peripherals 1222 such as keyboards and external storage/sensor devices, and random access memory (RAM) 1226. Though steps of the flowcharts herein generally refer to the training system 600, it is understood that steps may be performed at the user device 1202 and training system 600 in various combinations. The machine learning function 116 may implement any number of suitable machine learning processes, algorithms, or techniques including anomaly detection, Naive Bayes classifiers, support vector machines, decision tree learning, neural network learning, reinforcement learning, etc. The machine learning processes may be tailored with machine learning parameters by matter of design choice (e.g., kernel type for support vector machines, number of trees for decision trees, etc.).

The machine learning function 116 may transform the input values to determine patterns, correlations, features, statistics, predictions, or classifications. The machine learning function 116 may monitor sensor data record in memory 1240 of the user device 1202 to establish user profiles and perform automated actions via machine learning output. That is, the training system 600 and/or user device 1202 may receive an output from the machine learning function 116 to help automate actions in the environment. In this example, user-classified data related to an aircraft marshaller signaling an aircraft may be used to automatically detect/prevent a hazard in the environment 1200 related to a misstep taken by the pilot or aircraft marshaller.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A worksite safety system comprising:
   an interface configured to receive first evaluations of a first scene from a group of trainees, the first scene belonging to safety curriculum content and depicting a worksite with a known hazard that is associated in memory with a hazard profile; and
   a safety training controller configured to determine a trusted subgroup of the trainees that correctly identified the known hazard in the first scene based on a match between the first evaluations and the hazard profile,
   the interface configured to receive second evaluations of a second scene from the trusted subgroup of the trainees, the second scene depicting the worksite with an unknown hazard, and
   the safety training controller configured to train a machine learning function based on the second evaluations from the trusted subgroup of the trainees for automatic identification of hazard indications in the second scene depicting the worksite with the unknown hazard.

2. The worksite safety system of claim 1 further comprising:
   one or more sensors configured to record sensor data of the worksite,
   the safety training controller configured to apply the sensor data to the machine learning function trained with the second evaluations to automatically detect the hazard indications of the unknown hazard in the sensor data.

3. The worksite safety system of claim 2 wherein:
   the safety training controller is configured, in response to detecting the hazard indications of the unknown hazard in the sensor data, to generate an automatic action to perform for responding to the unknown hazard.

4. The worksite safety system of claim 1 wherein:
the safety training controller is configured to modify the safety curriculum content based on the first evaluations and the second evaluations.

5. The worksite safety system of claim 1 wherein:
the safety training controller is configured to determine a subset of trainees of the trusted subgroup of the trainees that provided an evaluation that includes additional hazard data, and to create the second scene based on the additional hazard data.

6. The worksite safety system of claim 1 wherein:
the safety training controller is configured to generate the second scene by retrieving scene data that preceded the first scene and the known hazard.

7. A method of training a machine learning function for worksite safety, the method comprising:
receiving first evaluations of a first scene from a group of trainees, the first scene belonging to safety curriculum content and depicting a worksite with a known hazard that is associated in memory with a hazard profile;
determining a trusted subgroup of the trainees that correctly identified the known hazard in the first scene based on a match between the first evaluations and the hazard profile;
receiving second evaluations of a second scene from the trusted subgroup of the trainees, the second scene depicting the worksite with an unknown hazard; and
training the machine learning function based on the second evaluations from the trusted subgroup of the trainees for automatic identification of hazard indications in the second scene depicting the worksite with the unknown hazard.

8. The method of claim 7 further comprising:
monitoring the worksite with one or more sensors to record sensor data of the worksite; and
applying the sensor data to the machine learning function trained with the second evaluations to automatically detect the hazard indications of the unknown hazard in the sensor data.

9. The method of claim 8 further comprising:
in response to detecting the hazard indications of the unknown hazard in the sensor data, generating an automatic action to perform for responding to the unknown hazard.

10. The method of claim 9 wherein:
the automatic action includes one or more of: generating a warning of the hazard indications present in the worksite, and automatically powering down a machine in the worksite.

11. The method of claim 7 further comprising:
modifying the safety curriculum content based on the first evaluations and the second evaluations.

12. The method of claim 7 further comprising:
determining a subset of trainees of the trusted subgroup of the trainees that provided an evaluation that includes additional hazard data; and creating the second scene based on the additional hazard data.

13. The method of claim 12 further comprising:
identifying the additional hazard data by:
analyzing the evaluation of a trainee to determine at least one alternative characteristic of the first scene that does not match the hazard profile.

14. The method of claim 12 further comprising:
generating the additional hazard data by:
requesting the trusted subgroup of the trainees to provide at least one characteristic of another scene in the safety curriculum content;
receiving the at least one characteristic of the another scene; and
identifying the at least one characteristic as the additional hazard data.

15. The method of claim 7 further comprising:
generating the second scene by retrieving scene data that preceded the first scene and the known hazard.

16. A non-transitory computer readable medium embodying programmed instructions executed by a processor, wherein the instructions direct the processor to perform a method of training a machine learning function for worksite safety, the method comprising:
receiving first evaluations of a first scene from a group of trainees, the first scene belonging to safety curriculum content and depicting a worksite with a known hazard that is associated in memory with a hazard profile;
determining a trusted subgroup of the trainees that correctly identified the known hazard in the first scene based on a match between the first evaluations and the hazard profile;
receiving second evaluations of a second scene from the trusted subgroup of the trainees, the second scene depicting the worksite with an unknown hazard; and
training the machine learning function based on the second evaluations from the trusted subgroup of the trainees for automatic identification of hazard indications in the second scene depicting the worksite with the unknown hazard.

17. The non-transitory computer readable medium of claim 16 wherein the method further comprises:
monitoring the worksite with one or more sensors to record sensor data of the worksite; and
applying the sensor data to the machine learning function trained with the second evaluations to automatically detect the hazard indications of the unknown hazard in the sensor data.

18. The non-transitory computer readable medium of claim 17 wherein the method further comprises:
in response to detecting the hazard indications of the unknown hazard in the sensor data, generating an automatic action to perform for responding to the unknown hazard.

19. The non-transitory computer readable medium of claim 16 wherein the method further comprises:
modifying the safety curriculum content based on the first evaluations and the second evaluations.

20. The non-transitory computer readable medium of claim 16 wherein the method further comprises:
determining a subset of trainees of the trusted subgroup of the trainees that provided an evaluation that includes additional hazard data; and
creating the second scene based on the additional hazard data.

* * * * *